(12) United States Patent
Heinrich et al.

(10) Patent No.: US 11,067,209 B2
(45) Date of Patent: Jul. 20, 2021

(54) CONNECTION ADAPTER, IN PARTICULAR FOR AIR-CONDITIONING SYSTEMS

(71) Applicants: AVL DiTest GmbH, Graz (AT); Carl Kurt Walther GmbH & Co. KG, Haan (DE)

(72) Inventors: Dirk Heinrich, Leichlingen (DE); Andreas Köpp, Dormagen (DE)

(73) Assignees: AVL DiTestGmbH, Graz (AT); Carl Kurt Walther GmbH & Co. KG, Haan (DE)

( * ) Notice: Subject to any disclaimer, the term of this patent is extended or adjusted under 35 U.S.C. 154(b) by 128 days.

(21) Appl. No.: 16/333,703

(22) PCT Filed: Sep. 15, 2017

(86) PCT No.: PCT/EP2017/073286
§ 371 (c)(1),
(2) Date: Mar. 15, 2019

(87) PCT Pub. No.: WO2018/050823
PCT Pub. Date: Mar. 22, 2018

(65) Prior Publication Data
US 2019/0226617 A1    Jul. 25, 2019

(30) Foreign Application Priority Data
Sep. 16, 2016 (AT) ................. A50835/2016

(51) Int. Cl.
*F16L 37/36* (2006.01)
*F16L 37/23* (2006.01)
*F16L 41/02* (2006.01)

(52) U.S. Cl.
CPC ............... *F16L 37/36* (2013.01); *F16L 37/23* (2013.01); *F16L 41/021* (2013.01)

(58) Field of Classification Search
USPC ....................................... 251/149.9
See application file for complete search history.

(56) References Cited

U.S. PATENT DOCUMENTS

| 3,301,272 A | * | 1/1967 | Pettyjohn | ................ F16L 37/22 137/614.06 |
| 3,680,591 A | | 8/1972 | Vik | |

(Continued)

FOREIGN PATENT DOCUMENTS

| DE | 102009012267 A1 | 9/2009 |
| JP | 2005331151 A | 12/2005 |

(Continued)

*Primary Examiner* — Angelisa L. Hicks
(74) *Attorney, Agent, or Firm* — Dykema Gossett PLLC

(57) ABSTRACT

A connection adapter for producing a detachable fluid connection between a first fluid system and a second fluid system is provided, the connection adapter comprising a switching valve; a housing including a pressure chamber and a valve chamber fluidly connected; an actuation element to actuate the switching valve to selectively open and close the fluidic connection; a ventilation path leading out of the connection adapter from the valve chamber; a ventilation shut-off means to close and open the ventilation path; a connection element fluidly connecting the pressure chamber to the first fluid system; a quick fastener socket fluidly connecting to the valve chamber and connects the valve chamber to a connection element of the second flush system; and a locking mechanism to lock the quick fastener socket and is restricted to a locked position when the ventilation shut-off means closes off the ventilation path.

6 Claims, 3 Drawing Sheets

(56) References Cited

U.S. PATENT DOCUMENTS

| | | | |
|---|---|---|---|
| 5,088,519 A | 2/1992 | Giroux et al. | |
| 6,450,199 B1 | 9/2002 | Haunhorst | |
| 7,267,140 B2 * | 9/2007 | Weh | F16L 37/36 |
| | | | 137/614.03 |
| 8,602,056 B2 * | 12/2013 | Schutz | F16L 37/565 |
| | | | 137/614.03 |
| 2003/0140971 A1 | 7/2003 | Haunhorst | |

FOREIGN PATENT DOCUMENTS

| | | |
|---|---|---|
| JP | 2015059637 A | 3/2015 |
| WO | 2004005787 A2 | 1/2004 |

* cited by examiner

CONNECTION ADAPTER, IN PARTICULAR FOR AIR-CONDITIONING SYSTEMS

CROSS-REFERENCE TO RELATED APPLICATIONS

This application is a national stage filing based upon International PCT Application No. PCT/EP2017/073286, filed 15 Sep. 2017, which claims the benefit of priority to Austria application No. A50835/2016, filed 16 Sep. 2016, the disclosures of which are incorporated herein by reference.

BACKGROUND

The invention relates to a connection adapter for producing a detachable fluid connection between a first fluid system and a second fluid system, in particular for producing a detachable fluid connection between a fluid system of an air-conditioning system and the fluid system of an air-conditioning service device, wherein the connection adapter has a switching valve, which is actuatable by means of an actuation element for the purposes of selectively opening up and closing off a fluid connection between a pressure chamber provided in a housing of the connection adapter and a valve chamber provided in the housing, wherein from the valve chamber, a ventilation path leads out of the connection adapter, which ventilation path can be closed off and opened by a ventilation shut-off means, wherein a fluid connection from the pressure chamber to the first fluid system can be produced by means of a connection element, wherein the valve chamber is fluidically connected to a quick fastener socket for the connection of a connection element of the second fluid system, and wherein the connection adapter has a locking mechanism for the quick fastener socket.

Connection adapters are used, for example, in order to provide a secure and detachable connection between two fluid systems. This is required, for example, in order to connect air-conditioning systems, in particular vehicle air-conditioning systems, to an air-conditioning service device or a reservoir of refrigerant, for filling purposes or for performing the servicing of the air-conditioning system. Prior art solutions for connection adapters for filling/emptying of air-conditioning systems, in particular of air-conditioning systems in the automotive industry, which use $CO_2$ as a refrigerant, are based on existing solutions for other refrigerants and do not fulfil the high sealing requirements, while ensuring a long operating life/operating cycle.

The previous solutions also do not provide durability of the sealing systems while ensuring a high sealing while operating under pressure, in particular when $CO_2$ is used as a refrigerant. Either a second energy source is required for operation or mechanically fragile systems are used. This is mainly due to the sealing systems or sealing arrangements for the ventilation function.

DE 10 2009 012 267 A1 discloses a 3/2-way valve, which is switchable by means of two tilt valves, for connection of a service device to an air-conditioning system. Both tilt valves are adjusted by a common control plunger, wherein a tilt valve represents the main valve, which connects or separates the fluid systems of the service device and of the air-conditioning system to and from each other, while the other tilt valve is used for ventilation.

The object of the invention is to provide a connection adapter, which eliminates the drawbacks of the prior art, which is usable in a simple and safe manner and which is very durable.

SUMMARY OF THE INVENTION

According to the invention, this and further objects are achieved by a connection adapter of said type, in which the locking mechanism is restricted to a lock position, when the ventilation shut-off means closes off the ventilation path. In this way, an incorrect operation is prevented and the safety of the connection adapter is increased.

The actuation element may be advantageously formed as a rotary knob, which may be screwed into a threaded bore of a housing for actuating the switching valve. This allows an intuitive, simple and safe actuation, while providing a compact construction.

In an advantageous embodiment, the actuation element may abut against a valve head of the switching valve upon screwing in, after the ventilation shut-off means has closed off the ventilation path. This ensures that a premature opening of the main valve (thus while the ventilation path is still open) is prevented.

The actuation element may be advantageously provided with an abutment, which blocks the locking mechanism in the locked position, when the ventilation shut-off means closes the ventilation path. This represents a constructively simple and effective means for restricting the locking mechanism according to the invention.

In a further advantageous embodiment, the ventilation shut-off means may be shaped like a sleeve and may be arranged on the housing such that it may slide along a valve axis. This allows a constructively simple implementation with a minimal use of moving parts.

Preferably, a sealing element may be provided on the housing, wherein the ventilation shut-off means sealingly engages the sealing element upon closing off the ventilation path. To this end, simple, cost-effective and durable sealing elements, such as O-rings, may be used.

In a further advantageous embodiment, the actuation element may be rotatably connected to the ventilation shut-off means. Thus, the ventilation shut-off means may move together with the actuation element in the axial direction in a purely translational way, without being coupled to the rotating movement of the actuation element. Moreover, the admissible extent of the movement of the actuation element may be easily restricted through the ventilation shut-off means.

BRIEF DESCRIPTION OF THE DRAWINGS

The present invention is explained in the following in further detail with reference to FIGS. 1 to 3, which show advantageous exemplary schematic and non-limiting embodiments of the invention. In particular

DETAILED DESCRIPTION

Figure 1:
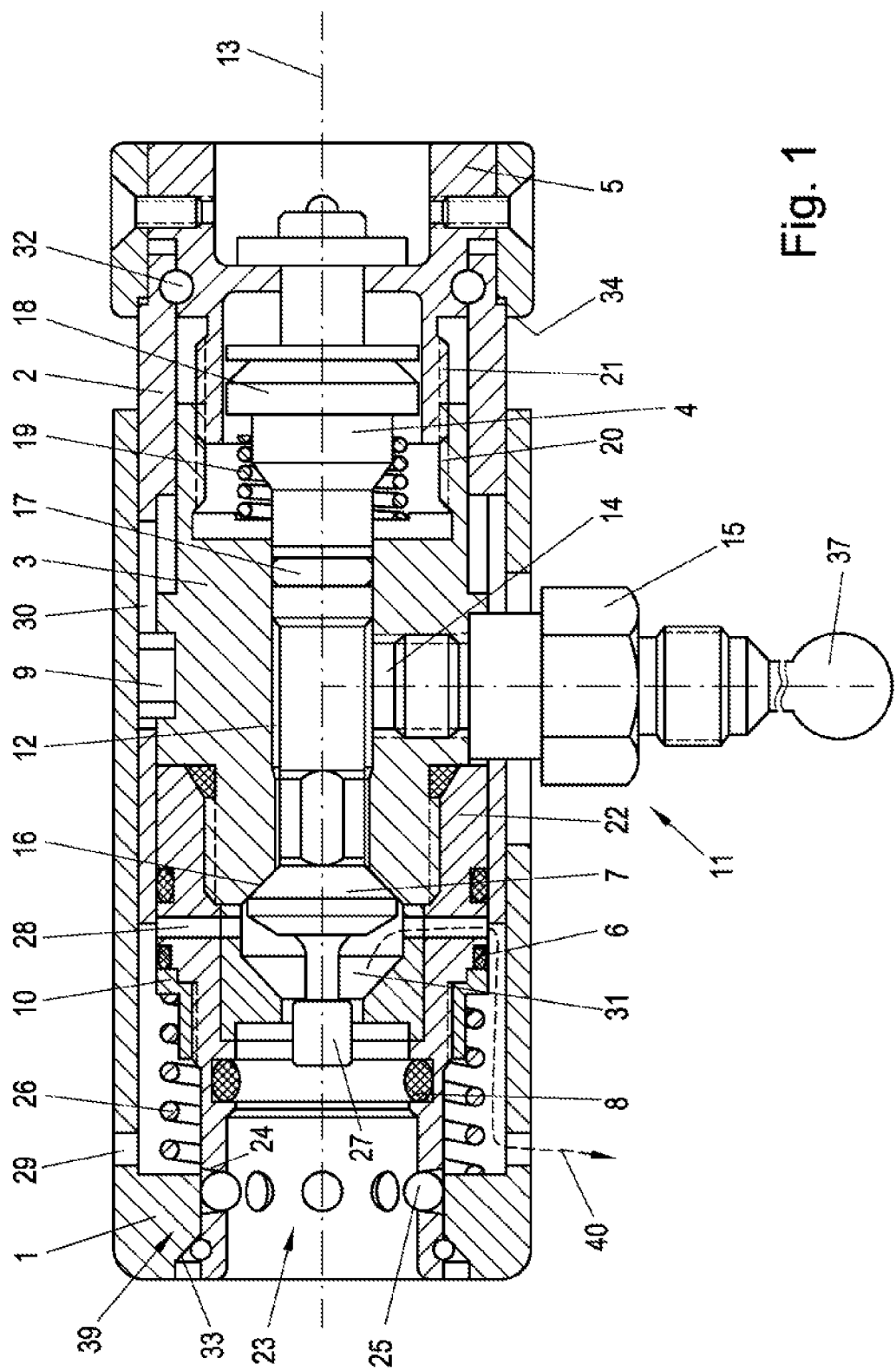
FIG. 1 shows a sectional view of the connection adapter according to the invention in a first position.

The connection adapter 11 according to the invention has a housing 3, which comprises a pressure chamber 12. The pressure chamber 12 is substantially formed as a central recess or bore extending along a valve axis 13, in which a switching valve 4 is arranged displaceably along the valve axis 13. A supply line 14 opens into the pressure chamber 12 transversally with respect to the valve axis. At the supply line, a connection element 15 is provided, through which the connection adapter 11 is in communication, such as via a line, with a service device or a refrigerant reservoir. In FIG. 1, a first fluid system 37 is shown schematically, to which the supply line and the connection element are connected.

The switching valve 4 has on one side a closing part 7 which, in the closed position of the switching valve 4 (FIGS. 1 and 2), seals the pressure chamber 12 on a conical valve surface 16. On the side of the pressure chamber 12 which is axially opposite the valve surface 16, the pressure chamber 12 is delimited by a form-fittingly enlarged diameter of the switching valve 4 and sealed with corresponding sealing elements 17. The end of the switching valve 4 axially opposite the closing element 7 has a substantially mushroom-shaped valve head 18, which is acted upon by a valve spring 19, which urges the switching valve 4 in the closed position.

Figure 2:
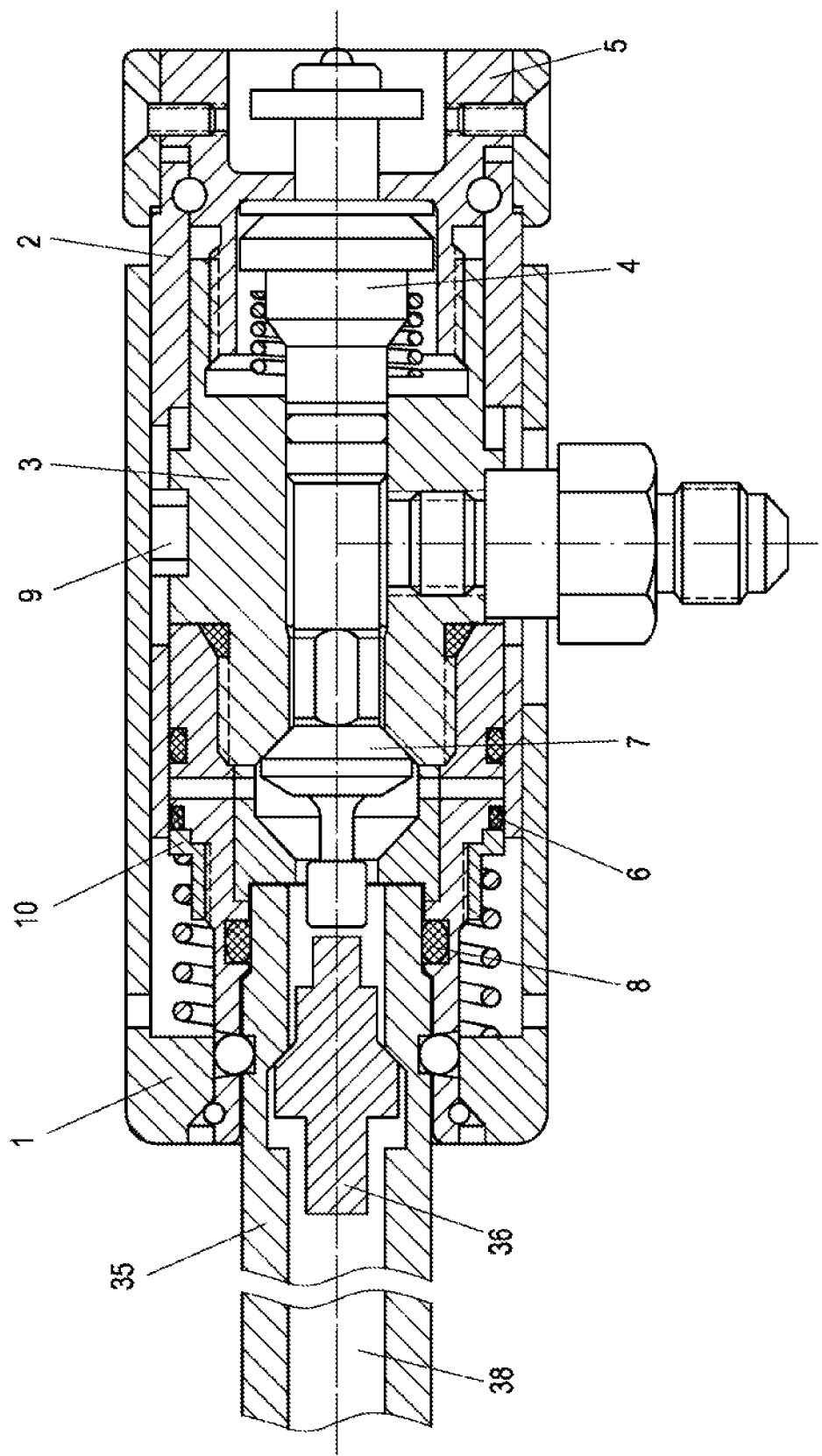
FIG. 2 shows the connection adapter of FIG. 1 in a second position and FIG. 3 shows the connection adapter of FIG. 1 in a third position.
Figure 3:
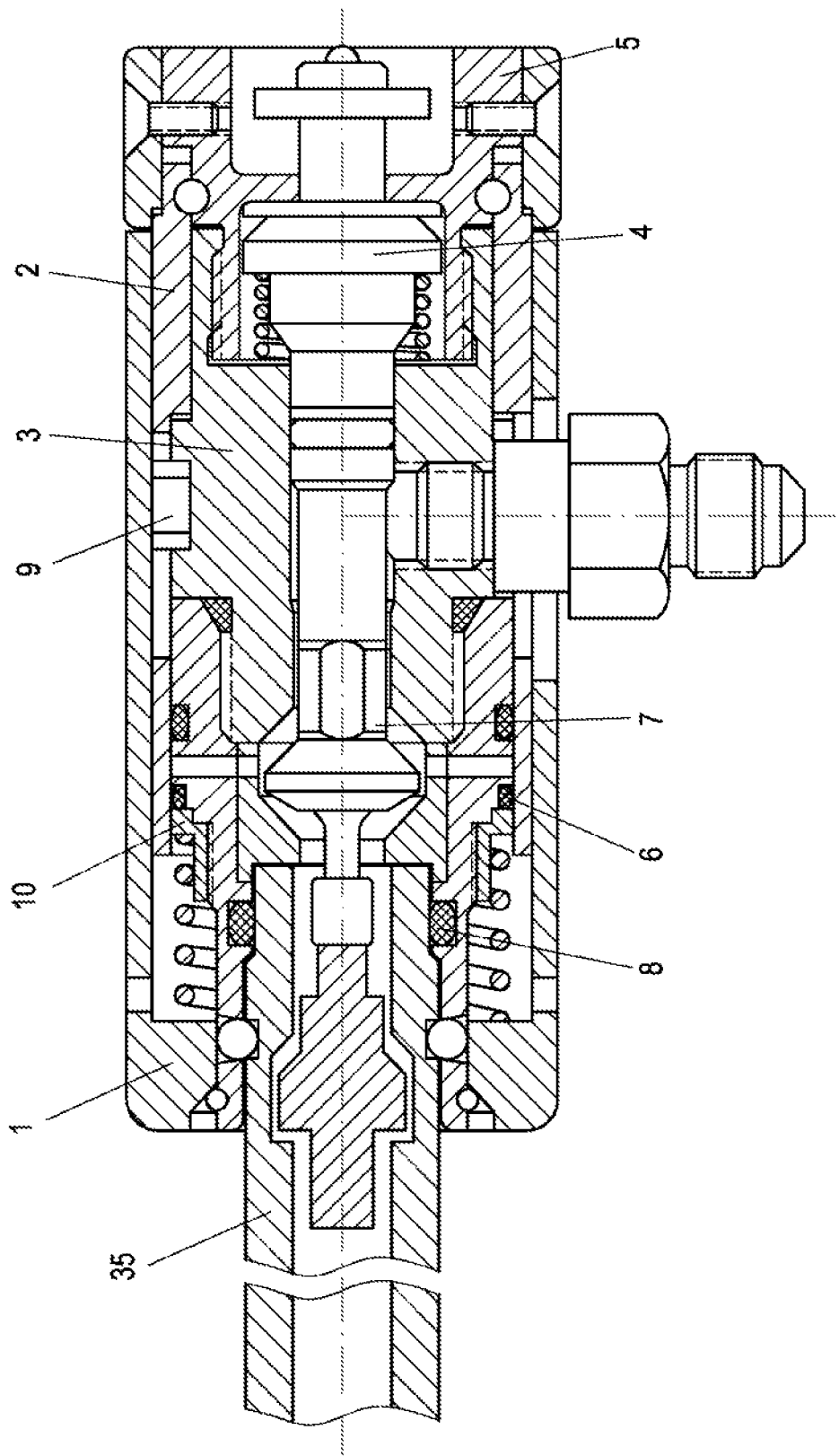

The housing 3 is provided, on the side of the valve spring 19 and of the valve head 18, with an axial threaded bore 20 into which an actuation element 5 designed as a rotary knob with an adjustment thread 21 may be screwed in and out. By screwing in the actuation element 5, this comes into abutment against the valve head 18 (FIG. 2) and subsequently pushes the valve head 18 and thus the entire switching valve 4 against the force of the valve spring into an open position (as shown in FIG. 3).

On the side of the valve surface 16, a part of the housing 3 is formed as a connection sleeve 22, wherein the connection sleeve 22 has a quick fastener socket 23, with which the connection adapter 11 may be connected to a correspondingly formed connection element 35 (shown schematically in FIGS. 2 and 3), such as a service connection of a car air-conditioning system. In a known manner respective shut-off balls 25 are inserted in radial bores 24, which are provided in the connection sleeve 22 in the region of the quick fastener socket 23, which balls are pushed by a locking sleeve 1 into the radial bores 23 (which are tapered towards the inner wall of the connection sleeve 22), in such a way that they protrude into the quick fastener socket 23, wherein they either fix a connection element 35 inserted therein or block the insertion of such a connection element 35 into the quick fastener socket 23. The spring-loaded locking sleeve 1 and the shut-off balls 25 inserted into the bores 23 thus form a locking mechanism 39 for the quick fastener socket 23.

For connecting and removing the connection element 35, the locking sleeve 1 is slidably retracted against the pressure of a tension spring 26 on the connection sleeve 22 until an enlarged region 33 of the locking sleeve 1 is disposed over the shut-off balls 25, and these can "deflect" into the enlarged region 33 and thereby enable insertion and removal of the connection element. The connection sleeve 22 may be formed in one or more parts and may be detachably or fixedly connected to the other parts of the housing 3. Optionally, the housing 3 may also be integrally formed, if technologically feasible.

In order to seal the connection element 35 inserted into the quick fastener socket 23, a connection seal 8 is provided in the quick fastener socket 23. The closing part 7 of the switching valve 4 has on its side facing away from the pressure chamber, a valve pin 27 axially projecting in the direction towards the quick fastener socket, the end of which projects into the region of the quick fastener socket 23. The valve pin 27 serves to urge a valve body of an optional shut-off valve 36 provided in the connection element 35 when the connection element 35 is inserted into the quick fastener socket 23 and the fluid connection is provided. The valve pin 27 is preferably dimensioned so that it opens the check valve 36 in the connection element 35 only when the switching valve 4 opens and the valve pin 27 moves axially together with the closing element 7 in the opening direction, i.e. towards the quick fastener socket 23 (see FIGS. 2 and 3).

In the region between the quick fastener socket 23 (or the end of a connection element inserted therein) and the closing part 7 resting on the valve surface 16 (the volume in this region is referred to below as the valve chamber 31), a number of ventilation channels 28 are arranged radially in the connection sleeve 22, through which a residual pressure existing in this region has to be vented, before the connection element 35 is removed from the quick fastener socket 23. In particular in the case of high pressures of about 150 bar, which are required for CO2 air-conditioning systems, it would be a significant security risk if the connection element 35 could be opened, while a residual pressure is still present, since pressure would escape uncontrollably and suddenly.

In order to seal the ventilation channels 28 for "normal" valve operation, a sleeve-like ventilation shut-off means 2 is slidably arranged on the housing. The ventilation shut-off means 2 has a guide slot 30 into which a guide element 9 provided on the housing 3 engages, which secures the ventilation shut-off means 2 against rotation. Optionally, the guide element 9 can also protrude beyond the outer wall of the ventilation shut-off means 2 and engage in a corresponding groove in the locking sleeve 1, so that the latter is also secured against rotation. When the ventilation shut-off means 2 is displaced in the direction of the quick fastener socket 23, it first covers the outer openings of the ventilation channels 28 and then engages with a sealing element 6 (possibly also a plurality of sealing elements may be provided), which is arranged on the outer wall of the connection sleeve 22, or in corresponding sealing grooves, which are provided in the connection sleeve. The ventilation shut-off means 2 thus seals the ventilation channels 28 pressure-tight as soon as the ventilation shut-off means 2 has been moved sufficiently far in the direction of the quick fastener socket 23 (FIGS. 2 and 3). The sealing element 6, which is arranged opposite the ventilation channels 28 on the side of the quick fastener socket 23, is arranged in a sealing groove which is formed by a holder 10 which can be screwed onto the connection sleeve 22. This facilitates its replacement due to sealing element 6 being highly stressed due to the frequently changing engagement with the ventilation shut-off means 2.

The locking sleeve 1 has ventilation bores 29, through which the space within the locking sleeve 1 can be vented. Since the ventilation channels 28 also open into this space, when the ventilation shut-off means 2 is in its retracted position (FIG. 1), the valve chamber 31 can be vented by retracting the ventilation shut-off means 2 through the ventilation channels 28 and the ventilation bores 29 (in the context of the present invention, the direction "backward" refers to the axial direction facing away from the quick fastener socket 23).

At its rear end, i.e. the quick fastener socket 23 remote end, the ventilation shut-off means 2 is rotatably connected via a ball bearing 32 with the actuation element 5, wherein the ball bearing 32 allows a rotational movement of the actuation element 5 relative to the ventilation shut-off means 2. As a result, the ventilation shut-off means 2 moves in the axial direction with the actuation element 5, without rotating with the actuation element. Thus, both the actuation of the closing part 7 (i.e. the main valve of the connection adapter), as well as the actuation of the valve pin 27, which opens the check valve 36 of the connection element 35, as well as the displacement of the ventilation shut-off means 2 are possible with a single actuation element 5. At the same time, the maximum possible "deflection movement" of the actuation element 5 is limited by the guide slot 30 and the guide element 9.

The use of the connection adapter 11 is explained below by way of example with reference to FIGS. 1 to 3. The starting position shown in FIG. 1 shows the connection adapter 11 in an inactive position, wherein the closing part 7 keeps the main valve closed, the ventilation path 40 defined by the ventilation channels 28 and the ventilation bores 29 is open, and the valve pin 27 protrudes freely in the region of the quick fastener socket 23, in which there is still no connection element 35. The connection adapter 11 is connected via the connection element 15 to the first fluid system 37, such as an air-conditioning service device, through which old refrigerant in a vehicle air-conditioning system may be drained, the air-conditioning system may be evacuated and filled with fresh refrigerant and lubricant.

In order to establish, via the quick fastener socket 23, a connection to a second fluid system 38, which comprises, for example, the lines of a motor vehicle air-conditioning system, a connection element 35 corresponding to the quick fastener socket 23 is provided for the second fluid system 38 (FIG. 2).

In order to establish a connection between the first fluid system 37 and the second fluid system 38, for example for an air-conditioning service or for initial filling of an air-conditioning system, the connection element 35 is inserted into the quick fastener socket 23 of the connection adapter 11, wherein the locking sleeve 1 sliding on the ventilation shut-off means 2 must be retracted until the enlarged region 33 of the locking sleeve 1 frees the shut-off balls 25 to an extent, such that the connection element 35 may be completely inserted into the quick fastener socket 23, i.e. until the locking mechanism 39 is opened. In this case, the connection element 35 is sealed by the connection seal 8, but the valve pin 27 is in a position in which the check valve 36 in the connection element 35 is not yet opened. This connection process is only possible if the actuation element 5 is in the maximum outward rotated position, since otherwise the locking sleeve 1 would be set with its rear end against an abutment 34 provided on the actuation element, before the shut-off balls 25 are released. This also ensures that the ventilation shut-off means 2 is in the retracted position in which the ventilation channels 28 are open and the ventilation path 40 is released.

In order to establish the fluid connection between the first fluid system 37 and the second fluid system 38, the actuator 5 is now rotated and screwed in, wherein at first only the ventilation shut-off means moves with the actuation element 5 and closes the ventilation channels 28, so that the valve chamber 31 is now hermetically sealed. This situation is shown in FIG. 2. It is to be noted that in this situation, although the main valve and the check valve 36 are still closed, it is no longer possible to release the lock on the quick fastener socket 23, since the locking sleeve 1 would abut against the abutment 34 before the shut-off balls 25 would be released. The situation shown in FIG. 2 also shows that the actuator 5 is already in contact with the valve head 18, so that a further screwing of the actuation element 5 would thus shift the switching valve 4 and thus the closing element 7 and the valve pin 25 in the direction of the quick fastener socket 23 and first open the main valve, i.e. create a fluid connection between the pressure chamber 12 and the valve chamber 31. Subsequently, the valve pin 27 then comes into abutment against the check valve 36 and opens the same, so that now also a fluid connection between the valve chamber 31 and the second fluid system 38 is created. This position is shown in FIG. 3. It should be noted that the abutment 34 of the actuation element 5 is now at or almost at the rear end of the locking sleeve 1, so that a displacement of the locking sleeve 1 is substantially no longer possible. Thus, a stable connection is created and now the various discharge, evacuation or refilling operations may be carried out via the connection adapter.

In order to remove the connection between the connection element 35 and the connection adapter 11 again, the process described above is carried out in the reverse direction, wherein the actuation element 5 is unscrewed from the threaded bore 20 of the housing 3. In this case, the shut-off valve 36 closes first and the valve pin 27 is released from the shut-off valve 36. Thereafter, the closing part 7 comes into abutment against the valve surface 16, so that the main valve closes (this corresponds again to the position shown in FIG. 2). Now, it should be noted that in the valve chamber 31, a residual pressure is present since the ventilation channels 28 are still closed by the ventilation shut-off means 2. The position of the shut-off means 34 ensures that in this position an unlocking of the quick fastener socket is not possible. Only when the actuation element 5 has been unscrewed far enough (i.e. into the position shown in FIG. 1) and the valve chamber 31 has been vented via the now open ventilation channels 28 and ventilation bores 29 (which form the ventilation path 40), it is possible to retract the locking sleeve 1 far enough, so that the shut-off balls 25 are released, thereby releasing the locking mechanism 39. Now, the connection element 35 can be pulled out of the quick fastener socket 23 and the connection adapter 11 is again in the starting position shown in FIG. 1.

The above description is merely illustrative of a preferred embodiment of the invention; however, it will be apparent to those skilled in the art that the invention may be practiced otherwise. For example, it is not necessary that the connection adapter is connected to the service device, and is connected via the quick fastener socket 23 to the connection element of the air-conditioning system, but the connection adapter 11 may also be part of the air-conditioning system. In this case, only one connection element would be required for the air-conditioning service unit, which is plugged in with the connection adapter of the air-conditioning system. In general, the connection adapter according to the invention can be used advantageously as a valve for different applications, in which two fluid systems are to be connected to one another.

LIST OF REFERENCE NUMERALS

Locking sleeve (1)
Ventilation shut-off means (2)
Housing 3
Switching valve (4)
Actuation element (5)
Sealing element (6)
Closing part 7
Connection seal 8
Guide element 9
Holder (10)
Connection adapter 11
Pressure chamber 12
Valve axis 13
Supply line 14
Connection element 15
Valve surface 16
Sealing elements 17

Valve head 18
Valve spring 19
Threaded bore 20
Adjustment thread 21
Connection sleeve 22
Quick fastener socket 23
Radial bores 24
Shut-off balls 25
Tension spring 26
Valve pin 27
Ventilation channels 28
Ventilation bores 29
Guide slot 30
Valve chamber 31
Ball bearing 32
Enlarged region 33
Abutment 34
Connection element 35
Shut-off valve 36
First fluid system 37
Second fluid system 38
Locking mechanism 39
Ventilation path 40

The invention claimed is:

1. A connection adapter for producing a detachable fluid connection between a first fluid system and a second fluid system, the connection adapter comprising:
- a switching valve including a closing element and a valve pin;
- a housing including a pressure chamber, a valve chamber and a threaded bore, the pressure chamber and the valve chamber being fluidly connected;
- an actuation element configured to actuate the switching valve to selectively open and close the fluidic connection between the pressure chamber and the valve chamber, the actuation element including a rotary knob configured and arranged to screw into the threaded bore of the housing;
- a ventilation path leads out of the connection adapter from the valve chamber;
- a ventilation shut-off means configured to close and open the ventilation path;
- a connection element fluidly connects the pressure chamber to the first fluid system;
- a quick fastener socket is configured to fluidly connect to the valve chamber, and thereby connect the valve chamber to a connection element of the second fluid system; and
- a locking mechanism configured to lock the quick fastener socket, and the quick fastener socket is restricted to a locked position when the ventilation shut-off means closes off the ventilation path;
- wherein the ventilation shut-off means is further configured to move in an axial direction with the actuation element upon actuation of the actuation element and the actuation element abuts, upon screwing in, against a valve head of the switching valve, after the ventilation shut-off means has closed the ventilation path, and a further movement of the actuation element in a direction of the quick fastener socket shifts the closing element and the valve pin of the switching valve in the direction of the quick fastener socket and opens the fluid connection between the pressure chamber and the valve chamber.

2. The connection adapter of claim 1, characterized in that the valve pin is arranged on the closing element with the valve pin further positioned on its side facing away from the pressure chamber and the valve pin axially projecting towards the quick fastener socket, with the end of the valve pin projecting into the region of the quick fastener socket.

3. The connection adapter of claim 1, characterized in that the actuation element includes an abutment configured to block the locking mechanism in the locked position, when the ventilation shut-off means closes the ventilation path.

4. The connection adapter of claim 1, characterized in that the ventilation shut-off means is sleeve shaped and is arranged on the housing such that it may slide along a valve axis.

5. The connection adapter of claim 4, further including a sealing element provided on the housing, and wherein the ventilation shut-off means is configured to sealingly engage the sealing element upon closing off the ventilation path.

6. The connection adapter of claim 1, characterized in that the actuation element is rotatably connected to the ventilation shut-off means.

* * * * *